United States Patent [19]
Stouffer et al.

[11] Patent Number: 5,827,976
[45] Date of Patent: Oct. 27, 1998

[54] FLUIDIC FLOW METER WITH FIBER OPTIC SENSOR

[75] Inventors: Ronald D. Stouffer, Silver Spring; Robert Bower, Odenton, both of Md.

[73] Assignee: Bowles Fluidics Corporation, Columbia, Md.

[21] Appl. No.: 489,514

[22] Filed: Jun. 12, 1995

[51] Int. Cl.⁶ .................................. G01F 1/20; G02B 6/10
[52] U.S. Cl. .................... 73/861.19; 385/13; 250/227.14
[58] Field of Search ................ 73/861.19; 250/227.14, 250/227.16, 227.24, 227.25; 385/12, 13

[56] References Cited

U.S. PATENT DOCUMENTS

| | | | |
|---|---|---|---|
| 3,889,534 | 6/1975 | Grant | 73/861.19 |
| 4,107,990 | 8/1978 | Ringwall | 73/861.19 |
| 4,151,955 | 5/1979 | Stouffer | 239/11 |
| 4,339,661 | 7/1982 | Pitt et al. | 73/861.22 |
| 4,880,971 | 11/1989 | Danisch | 250/227 |
| 5,038,620 | 8/1991 | Rogers, Jr. et al. | 250/227.16 |
| 5,097,252 | 3/1992 | Harvill et al. | 250/227.16 |
| 5,099,753 | 3/1992 | Stouffer | 454/125 |
| 5,127,173 | 7/1992 | Thurston et al. | 73/861.19 |
| 5,321,257 | 6/1994 | Danisch | 250/227.16 |
| 5,339,695 | 8/1994 | Kang et al. | 73/861.19 |

OTHER PUBLICATIONS

McGraw–Hill Encyclopedia of Science & Technology, 5th Edition. p. 1236. Oct. 1982.

*Primary Examiner*—Richard Chilcot
*Assistant Examiner*—Harshad Patel
*Attorney, Agent, or Firm*—Jim Zegeer, Esq.

[57] ABSTRACT

A fluidic flow meter comprising a fluidic oscillator having an oscillation chamber, a power nozzle for issuing a jet of fluid into the oscillation chamber, an outlet for issuing fluid from the oscillation chamber. A bendable fiber optic wave guide loop has a section adapted to lose light as a result of flexing or bending is mounted in a flow path in the oscillation chamber and subjected to oscillatory flow of the fluid. Light is injected into one end of the fiber optic wave guide and a detector senses the oscillatory loss of light in the fiber optic wave guide as a measure of fluid flow through the fluidic oscillator.

8 Claims, 7 Drawing Sheets

FIG. 4
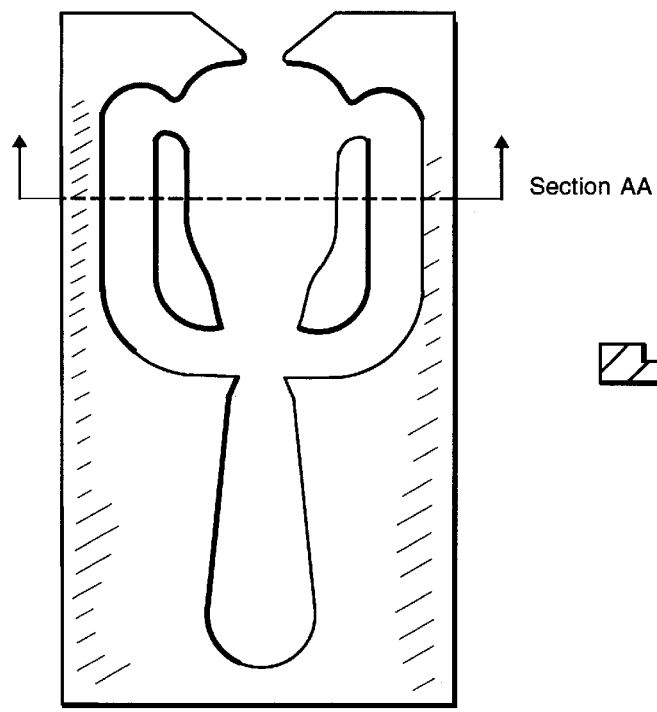
Section AA
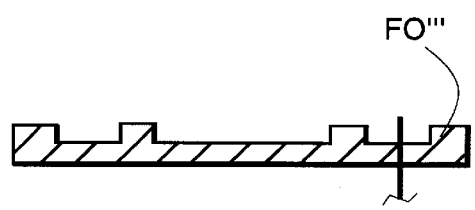
FIG. 5
FIG. 6A
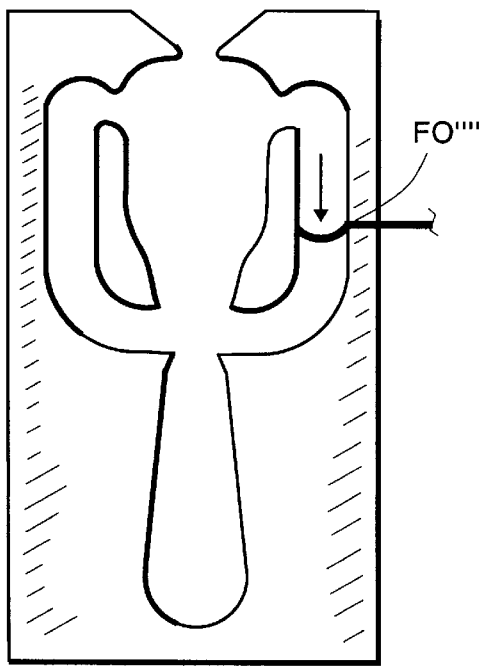
FIG. 6B
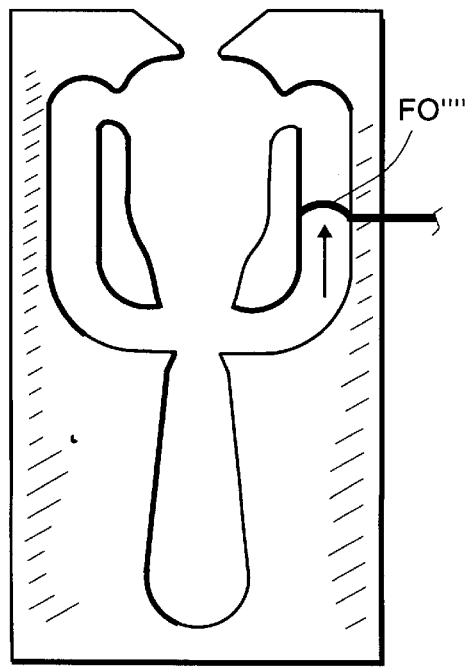

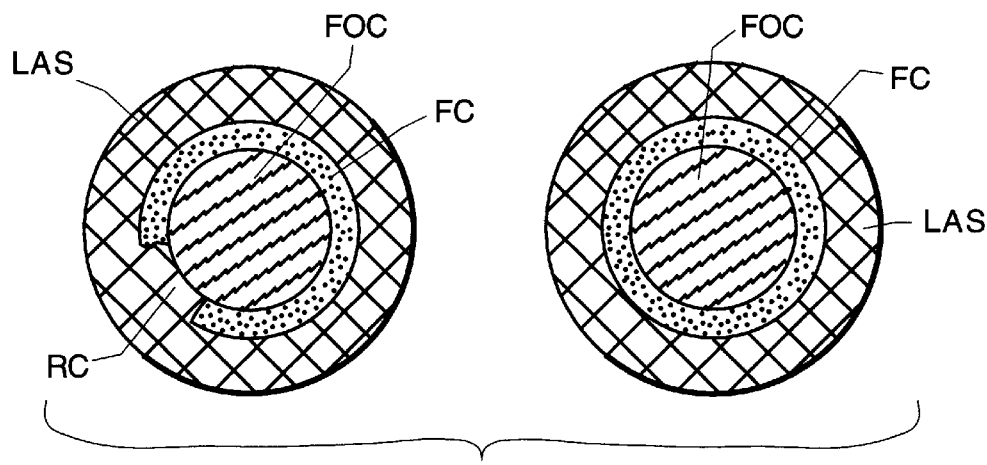
FIG. 11
FIG. 12A
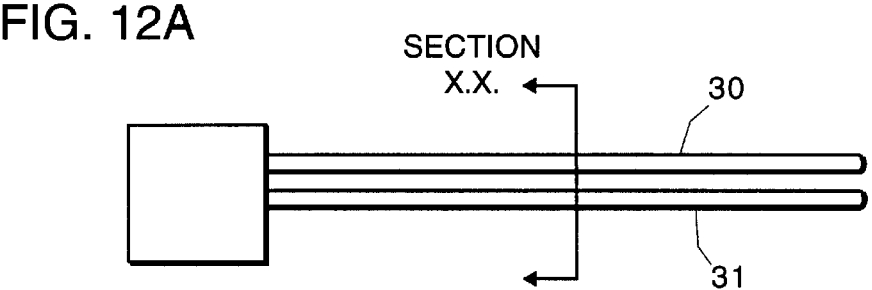
FIG. 12B
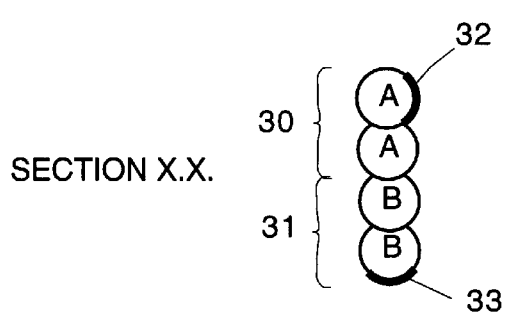
FIG. 12C
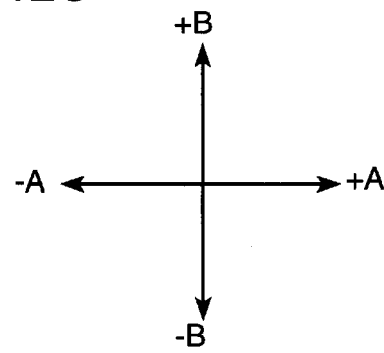

FLUIDIC FLOW METER WITH FIBER OPTIC SENSOR

BACKGROUND AND BRIEF DESCRIPTION OF THE INVENTION

It is well known that in a fluidic oscillator, the rate of oscillation is a function of the fluid flow rate through the oscillator and that by transducing pressure piezoelectrically or thermistor measured temperature changes in a feedback flow path in the oscillator, the rate of fluid flow can be converted to an electrical signal to perform a control or monitoring function. In one commercial fluid flow meter, a heated thermistor is located in a feedback passage. When feedback flow is a maximum or minimum, the heat carried away at a corresponding maximum or minimum and the rate of fluctuation is linear and directly proportional to flow rate.

Danisch patent 5,321,257 discloses a fiber optic bending and positioning sensor in which a fiber optic or light wave guide is attached to a member to be bent or displaced and light is injected at one end and detected at the other end. Bending of the fiber results in loss of light through a surface strip or bend along one side of the fiber and this loss is detected to produce an indication of the bending or displacement.

The object of the present invention is to provide an improved fluid flow metering system and method. A further object of the invention is to provide a fluidic oscillator with a highly flexible fiber optic wave guide which is adapted to flex with changes in fluid flow and lose light on flexing, and a detector senses the oscillatory loss of light as a measure of fluid flow through the oscillator and produce an electrical signal for control and/or monitoring functions.

The device measures flow rates of all fluids either by the degree to which a flexible fiber optic lead or light guide is bent or flexed by the frequency of its oscillation. The device includes a fiber optic or light guide loop treated in such a way as to lose light into a light absorbing covering in a repeatable and predictable manner when bent or flexed. When connected to the appropriate light source and electronic circuitry, the device will provide an electrical output having a frequency proportional to the rate of oscillation. In oscillating chambers such as a fluidic,the light guide which is located in the plane of the flow will maintain a position in the center of the jet or stream. In the preferred embodiment, the flexible fiber optic light guide will seek the maximum velocity point in the stream. As the jet switches from side to side, the light guide is compelled to switch also. Since the frequency of oscillation of the jet and therefore the fiber optic is directly proportional to the flow rate the output signal may be fed into a frequency counter or totalizer to give an output related to flow rate (Mode 1). In an alternate embodiment, the fiber optic is embedded in a section of the fluidic oscillator where flow reverses direction at a rate proportional to flow rate. In this case, when the flow is in a direction towards the free end of the light guide, the light guide will maintain a position in the center of the jet and will cause a certain output level. When the flow is from the free end of the fiber the flow forces the fiber towards the wall of the section, inducing a bend or flexure and changing the output level (Mode 2). A further operational mode (Mode 3) places the fiber in various planes perpendicular to the flow. The fiber may be held at one clamping location with the free end in the fluid flow or be held both at the free end and second clamping location. In each of these locations the fiber is used to detect the flow rate through its frequency of oscillation. Modes 1–3 utilize the fluidic oscillation of the fluid to compel the fiber to mirror the movement and hence generate an output whose frequency is proportional to flow rate. A pair of loops with light loss regions maintained at a 90° relation to each other can measure flow in multiple planes or three-dimensional directions.

DESCRIPTION OF THE DRAWINGS

The above and other objects, advantages and features of the invention will become more apparent when considered with the following specification and accompanying drawings wherein:

FIG. 4 is a top plan view of a fluidic oscillator showing the fiber optic sensor mounted in a further position in one of the feedback passages, FIG. 5 is a sectional view taken on lines A—A of Fig.4, FIGS. 6A and 6B are top plan views of a fluidic oscillator illustrating a further modification of the invention, FIG. 11 is a sectional view crossing the outbound loop section with cladding removed to form a light loss region and the inbound loop section, FIG. 12A illustrates an embodiment of the invention for measuring flow, movements in multiple planes, FIG. 12B is a sectional view on lines XX of FIG. 12A, and FIG. 12C illustrates the multiple sensing plane.

DETAILED DESCRIPTION OF THE INVENTION:

FIGS. 1A–6B illustrate a fluidic oscillator of the type in which a power nozzle PN issues a jet of fluid into an oscillation chamber OC having right and left side walls SWR, SWL, respectively, which diverge and then converge to an outlet opening OO which issues a jet of fluid, in this case to ambient. Initially, the jet travels from power nozzle PN through the throat in a straight stream. The power jet must expand sufficiently to fill the outlet throat before interaction region and the oscillation feedback channels OFCR and OFCL begin to fill. Vortices are formed on either side of the jet of the fluidic oscillator, and since two of the vortices cannot exist simultaneously with equal intensity, one vortex becomes dominant and the power stream will be diverted against the opposite wall and the oscillations begin.

Figure 1A:
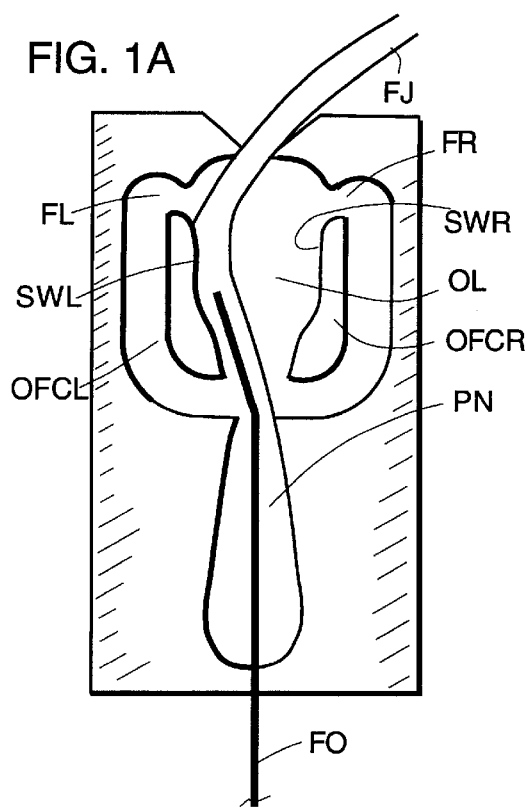
FIG. 1A is a top plan view of a fluidic oscillator with a section of the cover plate removed to expose the oscillator silhouette and the fiber optic sensor in one position and condition of operation.
Figure 1B:
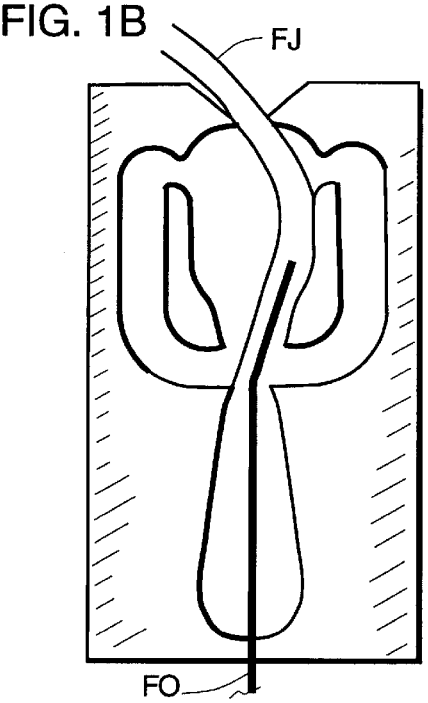
FIG. 1B is a top plan view similar to Fig. 1A but illustrating the oscillator and fiber optic sensor position and condition during a further portion of a cycle of oscillation.
Figure 2A:
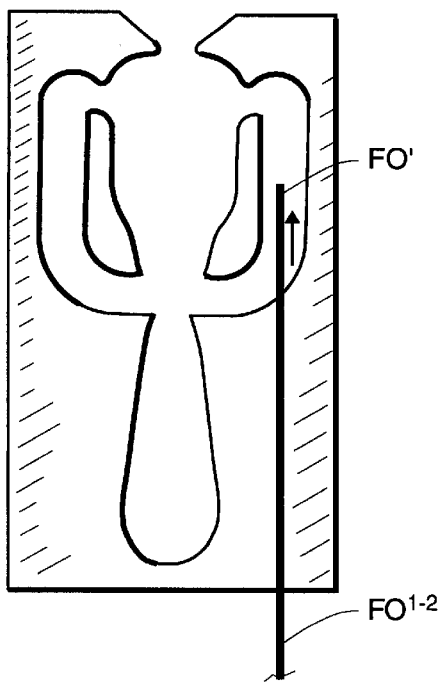
FIGS. 2A and 2B are top plan views of a similar fluidic oscillator showing the fiber optic sensor mounted in one of the feedback passages thereof.
Figure 2B:
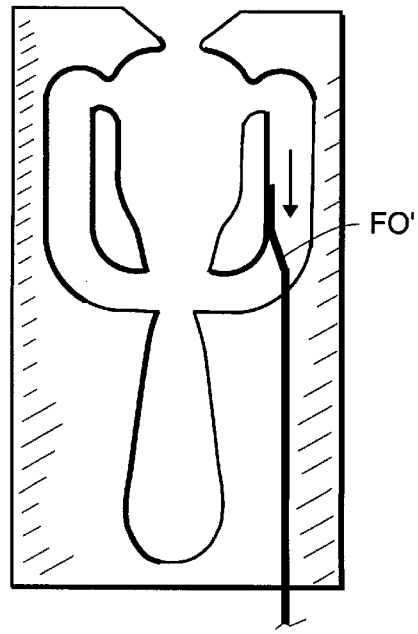
Figure 3A:
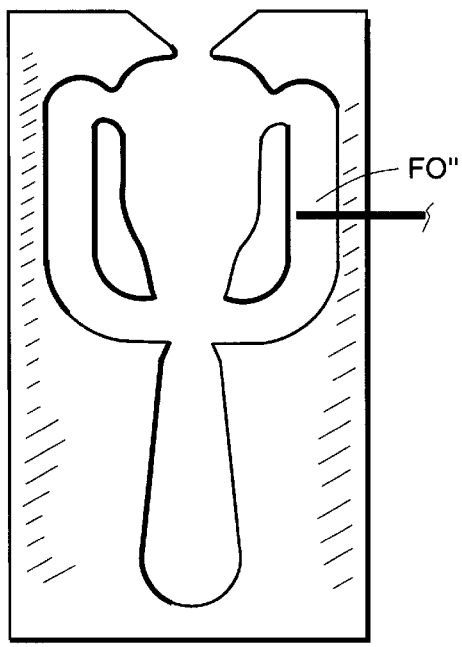
FIGS. 3A, 3B and 3C are top plan views of a similar fluidic oscillator showing the fiber optic sensor mounted in one of the feedback passages thereof.
Figure 3B:
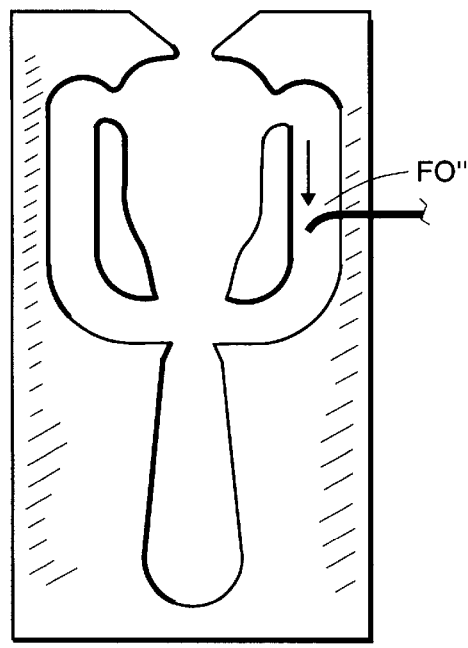
Figure 3C:
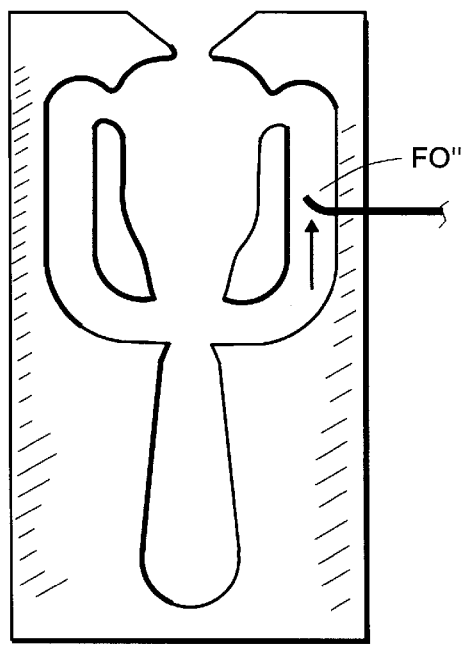

In the situation illustrated in FIG. 1A, for example, a dominant vortex is on the right-hand side of the chamber diverting the power stream against the opposite wall SWL. In the situation illustrated in Figure 1B, the dominant vortex is on the left-hand side with the power stream being diverted against the opposite wall in this case, SWR.

In the oscillator illustrated in FIGS. 1A–6B, the dominant vortex, in conjunction with the suction at the control port caused by the jet issuing from the power nozzle, cause the flow in the oscillation feedback channels OFCR and OFCL to reverse direction.

As the power stream flows along the wall, a portion of the fluid is received into a feedback passage FL or FR. The fluid in the feedback passages FL or FR is directed against the power stream entering the oscillation chamber OC adjacent the power nozzle PN, forcing the jet to the opposite side where a corresponding operation takes place forcing it to the opposite side again thereby causing the oscillation to ensue.

Figure 7A:
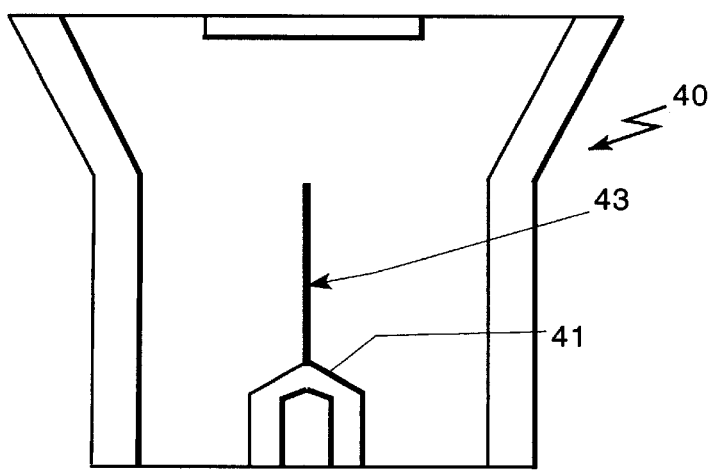
FIGS. 7A, 7B and 7C illustrate the invention as applied to an island-type oscillator.
Figure 7B:
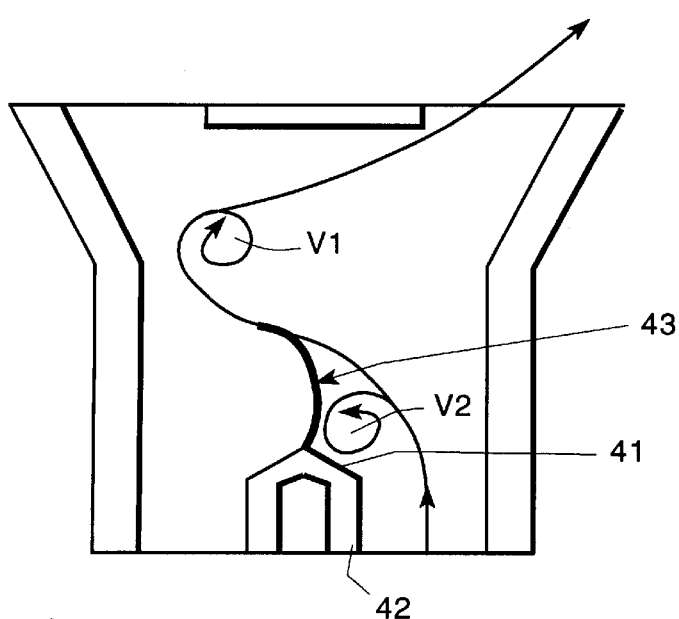
Figure 7C:
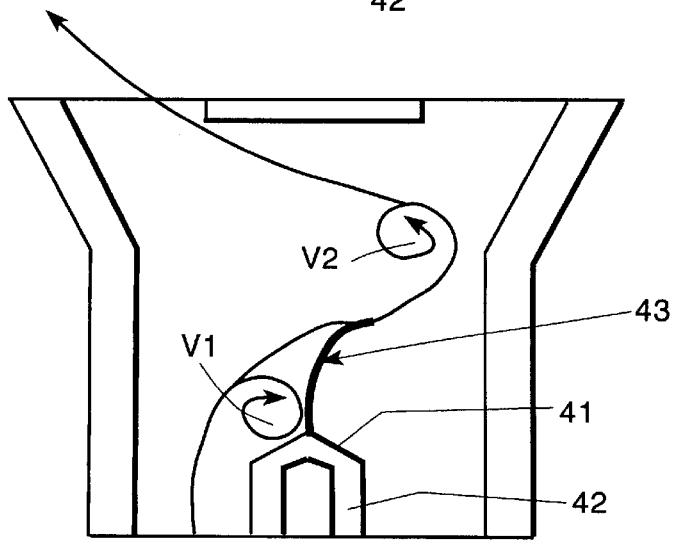

In the island-type oscillators shown in FIGS. 7A–7C, oscillation is caused by oppositely rotating vortices, V1 and V2 being shed off of opposite sides of the barrier or island 42.

Figure 8A:
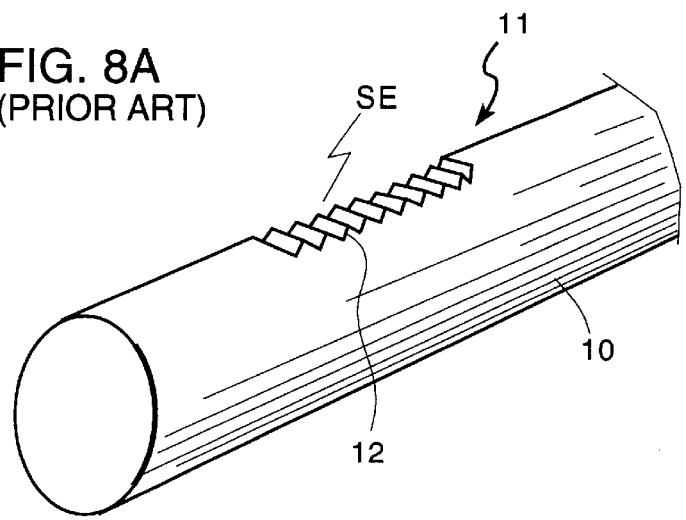
FIGS. 8A, 8B and 8C illustrate various features of prior art fiber optic sensors or detectors useful in the practice of the invention.
Figure 8B:
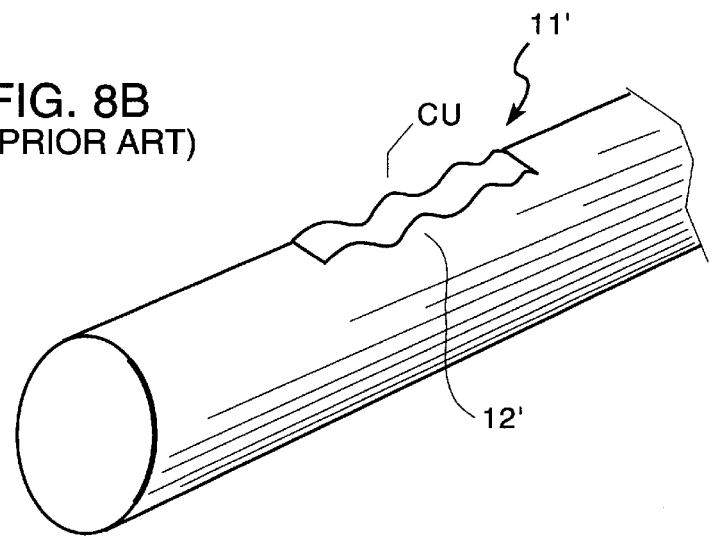
Figure 8C:
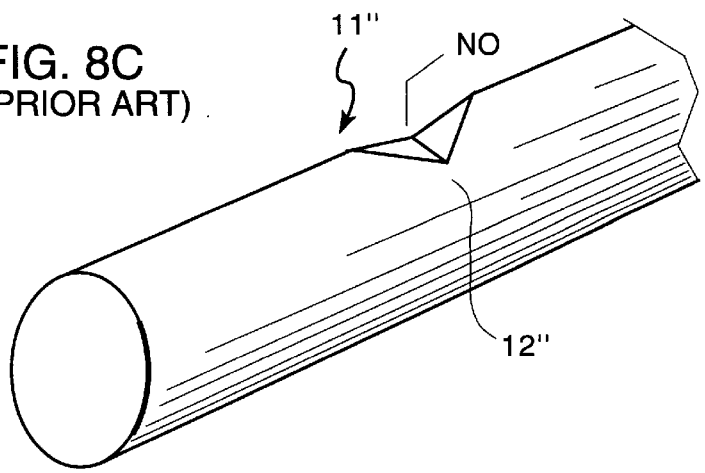
Figure 9:
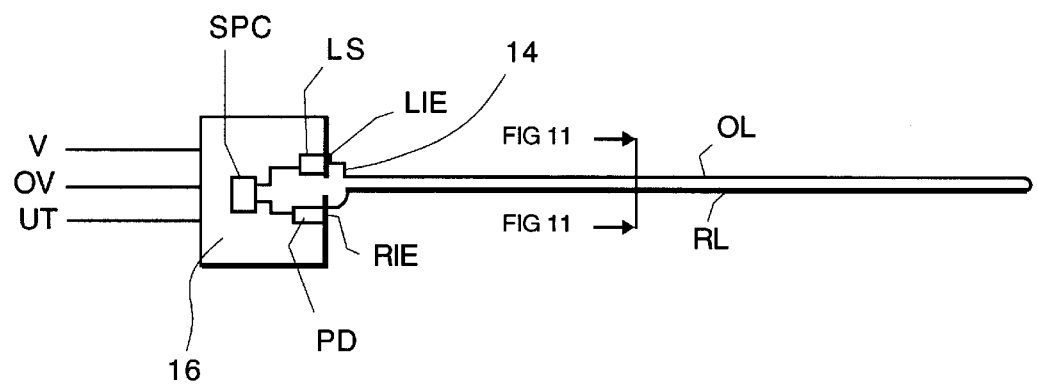
FIG. 9 illustrates the fiber optic loop coupled to an interface box containing a light source or photoemitter and photodetector.
Figure 10:
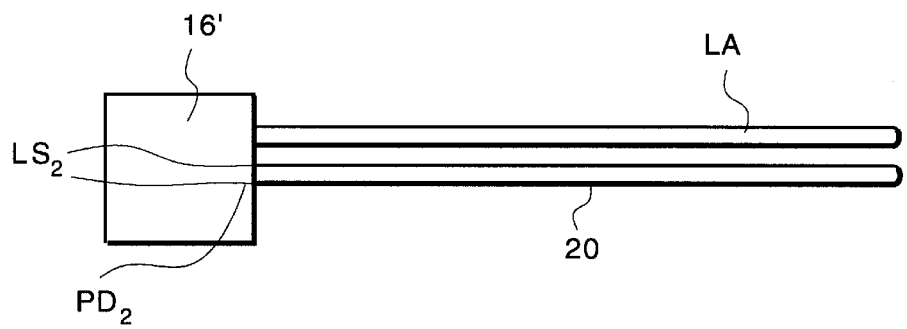
FIG. 10 illustrates the fiber optic measuring loop and an associated reference fiber optic loop.

Fiber optic sensors FO (primed in the later embodiments) useful in the practice of the invention are disclosed in Danisch patents 5,321,257 and 4,880,971, incorporated herein by reference. FIGS. 8A, 8B and 8C disclose fiber optic light guides 10 having a light emission surface 11 extending along one side of the fiber. Light emission from surface 11, which can be treated as at 12, increase when the fiber is bent or flexed in one direction and decrease when the fiber is bent or flexed in the opposite direction. The fiber optic light guide can be in the form of a simple strand or plural fiber strands. As shown in FIG. 9, one end 14 of the fiber optic light guide can be coupled to a light source or photoemitter LS and the opposite end coupled to photodetector PD which are part of an electronic circuit 16 which measures the difference in intensity between light emitted by source LS and detector PD. Optionally, a second fiber optic light guide loop 20 (FIG. 10) made of the same length and material, but without the light emission surface, may be provided as a reference or standard. Reference fiber optic light guide loop 20 is coupled to a second source $LS_2$, and detector $PD_2$.

FIGS. 8A, 8B and 8C illustrate serrated SE corrugated CU and notched NO regions of surface treatments to show various ways in which light loss in a selected surface area can be achieved. In FIG. 9, the loop has a light input end LIE coupled to a light source LS. Light loss region or surface area RC is positioned where flex or bend of the fiber optic light guide occur due to changes in flow direction. In the embodiment illustrated in FIG. 9, the outbound leg OL of the fiber optic loop is selected as having the light loss region RC (see FIG. 11). The inbound or return leg has its end RIE coupled to a photodetector PD and a signal processing circuit SPC is coupled to the photodetector PD.

As shown in FIG. 11, the fiber optic light guide is comprised of a fiber optic core FOC, fiber optic cladding FC, a portion of the cladding being removed as at RC to form a light loss or treated region. A light absorbing sheath LAS may be provided to reduce stray light effects. As shown in FIGS. 8A, 8B and 8C, various methods of causing light loss upon flexure or bending of the sensor include serration SE, corrugation CU and notching NO, or other roughening treatments.

A pair of fiber optic waveguide loops 30, 31 in which the outbound and inbound portions are maintained in a fixed relation to each other is shown in FIGS. 12A and 12B. Loop 30 has a light loss region or treated section 32 (facing in a given direction (right in FIG. 12B) and the fiber optic loop 31 has a treated light loss or treated region 33 facing in a direction 90° relative to the facing direction of treated section 32 (e.g., down in FIG. 12B). Thus, since the loops are maintained in fixed relation, any direction and degree of flex or bend of the combined loops can be detected and measured.

The invention can be applied to measure flow rates wherever there is an oscillatory movement of fluid flow that is proportional to flow rate. While several forms of fluidic oscillators are disclosed herein, the invention is believed to be applicable to all forms of fluidic oscillators or systems where there is oscillatory fluid flow.

Referring now to FIGS. 1A to 7C, the device measures flow rates of all fluids by the frequency of oscillation of the fiber optic lead or light guide. The device includes a fiber optic or light guide loop treated in such a way as to lose light into a light absorbing covering in a repeatable and predictable manner when bent. When connected to the appropriate electronic circuitry and light source, the device will provide an output proportional to the degree of bending. In oscillating chambers such as a fluidic (FIGS. 1A and 1B), the light guide which is located in the plane of the flow will maintain a position in the center of the jet or stream. As the jet switches from side to side, the light guide is compelled to switch also. Since the frequency of oscillation of the jet and therefore the fiber optic is directly proportional to the flow rate the output signal may be fed into a frequency counter or totalizer to give an output related to flow rate (Mode 1). In an alternate embodiment, the fiber optic element is embedded in a section of the fluidic oscillator where flow reverses direction at a rate proportional to flow rate (FIGS. 2A and 2B). In this case, when the flow is in a direction towards the free end of the light guide (FIG. 2A), the light guide will maintain a position in the center of the jet and will cause a certain output level. When the flow is from the free end of the fiber (FIG. 2B) the flow forces the fiber towards the wall of the section, inducing a bend or flexure and changing the output level (Mode 2). A further operational mode (Mode 3) places the fiber in various planes perpendicular to the flow (FIGS. 3–6). The fiber may be held at one clamping location with the free end in the fluid flow (FIGS. 3–5) or be held in two clamping location (FIG. 6). In each of these locations the fiber is used to detect the flow rate through its frequency of oscillation. Modes 1–3 utilize the fluidic oscillation of the fluid to compel the fiber to mirror the movement and hence generate an output whose frequency is proportional to flow rate. An island oscillator 40 of the type shown in Stouffer patents 4,151,955 and 5,099,753 is shown in FIGS. 7A–7C. In this case, the fiber optic loop 43 is mounted at the apex 41 of island 42.

While there has been shown and described various preferred embodiments of the invention, it will be appreciated that various other embodiments, modifications and adaptations of the invention will become readily apparent to those skilled in the art. It is intended that such other obvious adaptations and modifications be incorporated within the true spirit and scope of the claims appended hereto.

We claim:

1. A fluidic flow sensor comprising a fluidic oscillator having an oscillation chamber, a power nozzle for issuing a jet of fluid into said at least one oscillator chamber, an outlet for issuing fluid from said oscillation chamber, means in said oscillation chamber for causing said jet of fluid to sweep back and forth within said oscillation chamber, and a flexible fiber optic wave guide adapted to lose light as a result of bending, means for mounting said fiber optic wave guide in a flow path in said oscillation chamber subject to oscillatory flow of said fluid, means for injecting light into one end of said fiber optic wave guide and means for detecting the loss of light from said fiber optic wave guide as a measure of fluid flow through said oscillation chamber.

2. The fluidic flow sensor defined in claim 1 wherein said flexible fiber optic waveguide is mounted at an upstream position in said power nozzle.

3. The fluidic flow sensor defined in claim 1 wherein said fluidic oscillator has at least one feedback passage and said flexible fiber optic waveguide is mounted in said at least one feedback passage.

4. The fluidic flow sensor defined in claim 1 wherein said flexible fiber optic waveguide has a light input end and a light output end, a light source coupled to said light input end and a photodetector coupled to said light output end and circuit means for measuring fluctuation in light issuing from said light output end as the measure of fluid flow through said oscillation chamber.

5. The fluidic flow sensor defined in claim 4 wherein said fluidic oscillator has an upstream end and a downstream end and said flexible fiber optic waveguide is adapted to seek the maximum velocity point in said stream as fluid flow oscillates in said fluidic oscillator.

6. The fluidic flow sensor defined in claim 1 wherein said flexible fiber optic wave guide is comprised of at least a pair of loops, each loop having input and output ends, and a surface section adapted to lose light on flexing, said surface section adapted to lose light on bending, one of said loops being maintained at a predetermined angle relative to the other of said surface section adapted to lose light and form a reference for the other of said loops.

7. A fluidic flow sensor comprising a fluidic oscillator having an oscillation chamber, a power nozzle for issuing a jet of fluid into said oscillation chamber, an outlet for issuing fluid from said oscillation chamber, means in said oscillation chamber for causing said jet of fluid to sweep back and forth within said oscillation chamber, and a flexible fiber optic wave guide having a light input end and a light output end and a predetermined surface area which is adapted to lose light as a result of flexing, means for mounting said fiber optic wave guide in a flow path in said oscillation chamber subject to oscillatory flow of said fluid, means for injecting light into one end of said fiber optic wave guide and means for detecting loss of light from said surface area due to oscillatory flow of said fluid as a measure of fluid flow through said oscillation chamber.

8. A fluidic flow sensor comprising a fluidic oscillator having an oscillation chamber, a power nozzle for issuing a jet of fluid into said oscillation chamber, an outlet for issuing fluid from said oscillation chamber, means in said oscillation chamber for causing said jet of fluid to sweep back and forth within said oscillation chamber, and a pair of flexible fiber optic loops, each loop having a light input end and a light output end and a predetermined surface area which is adapted to lose light as a result of flexing, said predetermined surface area being at different angular orientations on each of said loops, respectively, means for mounting said fiber optic loops in a flow path in said oscillation chamber subject to oscillatory flow of said fluid, means for injecting light into one end of said fiber optic loop and means for detecting loss of light from said surface areas due to oscillatory flow of said fluid as a measure of fluid flow through said oscillation chamber.

\* \* \* \* \*